(12) United States Patent
Eckhardt et al.

(10) Patent No.: US 9,401,099 B2
(45) Date of Patent: Jul. 26, 2016

(54) DEDICATED ON-SCREEN CLOSED CAPTION DISPLAY

(75) Inventors: Jost Eckhardt, Pawlet, VT (US); Hana Giat, Flushing, NY (US); Scott David Moore, Manchester Center, VT (US)

(73) Assignee: AI Squared, Manchester Center, VT (US)

( * ) Notice: Subject to any disclaimer, the term of this patent is extended or adjusted under 35 U.S.C. 154(b) by 322 days.

(21) Appl. No.: 12/777,717

(22) Filed: May 11, 2010

(65) Prior Publication Data

US 2011/0283243 A1 Nov. 17, 2011

(51) Int. Cl.
| | |
|---|---|
| *G06F 3/00* | (2006.01) |
| *G09B 21/00* | (2006.01) |
| *G06F 3/0488* | (2013.01) |
| *G06F 3/01* | (2006.01) |

(52) U.S. Cl.
CPC .......... *G09B 21/008* (2013.01); *G06F 3/04886* (2013.01); *G06F 2203/04803* (2013.01)

(58) Field of Classification Search
CPC . G06F 3/0481; G06F 3/0488; G06F 3/04855; G06F 3/0485
USPC .................. 715/865, 784; 348/461, 568, 564
See application file for complete search history.

(56) References Cited

U.S. PATENT DOCUMENTS

| | | | |
|---|---|---|---|
| 5,559,946 A * | 9/1996 | Porter ........................ 715/781 |
| 5,757,437 A * | 5/1998 | Song ........................... 348/564 |
| 6,330,010 B1 | 12/2001 | Nason et al. |
| 6,373,526 B1 * | 4/2002 | Kessler et al. ............ 348/468 |
| 6,591,008 B1 | 7/2003 | Surve et al. |
| 6,624,831 B1 | 9/2003 | Shahine et al. |
| 6,657,647 B1 * | 12/2003 | Bright ....................... 715/856 |
| 7,916,157 B1 | 3/2011 | Kelley et al. |
| 8,704,778 B2 * | 4/2014 | Miyashita et al. ......... 345/173 |
| 8,918,738 B2 * | 12/2014 | Yoshitomi et al. ......... 715/810 |
| 2001/0009445 A1 * | 7/2001 | Chung ....................... 348/556 |
| 2002/0003469 A1 * | 1/2002 | Gupta ...................... 340/407.1 |
| 2002/0196370 A1 | 12/2002 | Dagtas et al. |
| 2003/0058280 A1 * | 3/2003 | Molinari et al. ........... 345/771 |
| 2003/0122962 A1 * | 7/2003 | Kim ........................... 348/468 |

(Continued)

FOREIGN PATENT DOCUMENTS

| | | |
|---|---|---|
| EP | 2048651 A1 | 4/2009 |
| WO | WO 2008/042126 A2 | 4/2008 |

OTHER PUBLICATIONS

Zoomtext 9.1 Quick Reference Guide, Retrieved from the Internet: URL:http://www.aisquared.com/docs/zt918/Z91_ORG_US_English.pdf [retrieved on Jul. 25, 2011].

(Continued)

*Primary Examiner* — Toan Vu
(74) *Attorney, Agent, or Firm* — Wolf, Greenfield & Sacks, P.C.

(57) ABSTRACT

Methods and apparatus for displaying closed-captioning content on a display device. In response to determining that closed-captioning is desired, a display area of the display device is partitioned into non-overlapping portions. A first portion of the display area is configured to display the closed-captioning content and a second portion of the display area is configured to display a computer desktop. The closed-captioning content may be transformed by replacing at least some text in the closed-captioning content with at least one symbol based, at least in part, on a context of the at least some text in the closed-captioning content.

21 Claims, 8 Drawing Sheets

(56) References Cited

U.S. PATENT DOCUMENTS

| | | | |
|---|---|---|---|
| 2003/0137522 A1 | 7/2003 | Kaasila et al. | |
| 2003/0145337 A1* | 7/2003 | Xing | 725/136 |
| 2003/0214519 A1 | 11/2003 | Smith et al. | |
| 2004/0111272 A1* | 6/2004 | Gao et al. | 704/277 |
| 2005/0039147 A1* | 2/2005 | Jones et al. | 715/856 |
| 2005/0069843 A1* | 3/2005 | Bagues | 434/127 |
| 2005/0105890 A1* | 5/2005 | Chung et al. | 386/95 |
| 2005/0184993 A1* | 8/2005 | Ludwin et al. | 345/502 |
| 2007/0033542 A1* | 2/2007 | Winser et al. | 715/788 |
| 2007/0033543 A1 | 2/2007 | Ngari et al. | |
| 2007/0033544 A1 | 2/2007 | Fleisher et al. | |
| 2007/0038955 A1* | 2/2007 | Nguyen | 715/804 |
| 2007/0106724 A1* | 5/2007 | Gorti | G06Q 10/10 709/204 |
| 2007/0136692 A1 | 6/2007 | Seymour et al. | |
| 2007/0198932 A1* | 8/2007 | Uchimura | 715/723 |
| 2008/0059152 A1* | 3/2008 | Fridman et al. | 704/9 |
| 2008/0063078 A1* | 3/2008 | Futenma et al. | 375/240.19 |
| 2008/0119274 A1 | 5/2008 | Eck et al. | 463/40 |
| 2008/0303645 A1* | 12/2008 | Seymour et al. | 340/407.2 |
| 2009/0111487 A1* | 4/2009 | Scheibe | 455/456.6 |
| 2009/0132234 A1* | 5/2009 | Weikel | 704/3 |
| 2009/0249235 A1* | 10/2009 | Kim et al. | 715/765 |
| 2009/0268090 A1* | 10/2009 | Chung et al. | 348/468 |
| 2010/0070489 A1* | 3/2010 | Aymeloglu et al. | 707/722 |
| 2010/0083192 A1* | 4/2010 | Zaman et al. | 715/866 |
| 2010/0271944 A1* | 10/2010 | Michaelis et al. | 370/230.1 |
| 2011/0014595 A1* | 1/2011 | Birr | 434/185 |
| 2011/0161871 A1 | 6/2011 | Stringer et al. | |
| 2011/0252302 A1 | 10/2011 | Yalovsky | |
| 2011/0265029 A1* | 10/2011 | Jeong | 715/784 |
| 2012/0102430 A1* | 4/2012 | Kobayashi | 715/784 |
| 2012/0158406 A1* | 6/2012 | Bells et al. | 704/260 |
| 2014/0229887 A1* | 8/2014 | Ellis et al. | 715/781 |

OTHER PUBLICATIONS

International Search Report and Written Opinion for International Application No. PCT/US2011/034960, mailed Aug. 25, 2011.

Zoomtext 9.1 User's Guide, $2^{nd}$ ed., Ai Squared, Manchester Center, Vermont, Feb. 2009.

International Search Report and Written Opinion for PCT/US2011/034975, mailed Aug. 4, 2011.

* cited by examiner

DEDICATED ON-SCREEN CLOSED CAPTION DISPLAY

BACKGROUND

Many modern operating systems executing on a computer provide a virtual area, often called a "desktop," that serves as a user interface into which visual content such as images, icons, menus, or application user interfaces, may be drawn. The desktop, including its drawn visual content, may then be displayed onto one or more display devices connected to the computer.

A typical computer desktop may be of limited use, however, to visually impaired users, who may not be able to adequately perceive content as it is typically displayed onto a display device. Accordingly, some users use Accessibility Technology (AT) software applications, such as ZoomText™ 9.1 Magnifier/Reader, developed by Ai Squared, Inc., of Manchester Center, Vt., that facilitate visually-impaired users' use of computers. For example, such AT applications can apply enhancements, such as color enhancements, highlighting, magnification, or other enhancements, to a computer desktop to help a visually impaired user to more easily perceive displayed content. In one mode of operation, as illustrated by FIGS. 1A and 1B, an AT software application may magnify a portion (also referred to as a "viewport") of a computer desktop 102. Viewport 106, rather than the full desktop area of desktop 102, is then displayed on display device 104. In the example of FIG. 1A, although viewport 106 includes only a portion of the full area of desktop 102, it occupies the full display area of display device 104, thereby allowing for magnification of the content in the viewport.

The boundaries defining the viewport may be adjusted, thereby allowing a user to move the viewport to magnify or otherwise enhance a different portion of the desktop. As can be seen by FIG. 1B, viewport 106 has been moved to a different portion of desktop 102. The viewport may be moved, for example, when a user causes the mouse cursor to move to the edge of the current viewport boundary, which is taken as an indication that the user desires the viewport to be moved to display visual content beyond that edge boundary. Accordingly, display device 104 shows a magnified view of the different portion of desktop 102, rather than the portion defined by the position of viewport 106 in FIG. 1A.

Another augmentative communication method that facilitates the perception of information presented on a display is closed-captioning. Closed-captioning is typically used to facilitate the perception of spoken content by hearing-impaired users. Conventional closed-captioning techniques overlay text onto visual content displayed on a display device by rendering prepared text in an opaque text box (e.g., white content on a black background). The text box may be displayed at the top or bottom of the screen or the position of the text box may change depending on the visual content that is obscured by the text box. Although conventional closed-captioning techniques obscure some of the displayed visual content, the benefit to the user in some circumstances may outweigh the fact that some of the visual content is obscured.

SUMMARY

Some embodiments are directed to a method of displaying closed captioning content on a display device having a display area. The method comprises receiving a first instruction to display the closed captioning content on the display device, partitioning the display area into a first portion and a second portion in response to receiving the first instruction, displaying the closed captioning content on the first portion of the display area, and displaying at least a portion of a computer desktop on the second portion of the display area.

Some embodiments are directed to a computer-readable storage medium comprising computer-readable instructions that, when executed by a computer, perform a method of displaying closed captioning content on a display device having a display area. The method comprises receiving a first instruction to display closed captioning content on the display device, partitioning the display area into a first portion and a second portion in response to receiving the instruction, displaying the closed captioning content on the first portion of the display area, and displaying at least a portion of a computer desktop on the second portion of the display area.

Some embodiments are directed to a computer system comprising at least one display device having a display area and at least one processor. The at least one processor is programmed to partition the display area into a first portion and a second portion in response to receiving a first instruction to display closed captioning content, display the closed captioning content on the first portion of the display area, and display at least a portion of a computer desktop on the second portion of the display area.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Closed-captioning content may be beneficial to impaired- and low-vision users by enabling such users to focus on information of interest without having to identify and magnify individual portions of a computer desktop. To this end, the inventors have recognized and appreciated that the support for closed captioning within Accessibility Technology (AT) software may be improved by displaying closed-captioning content on a first portion of a display area of a display device while displaying the computer desktop on a second portion of the display area. By presenting the closed-captioning content on a non-overlapping portion of the display area that is separate from the desktop, rendering the closed-captioning content on the display area does not obscure any of the visual content displayed on the desktop. Rather, the desktop may be displayed on a separate portion of the display area so that the entire desktop area is viewable to the user (e.g., by scrolling up or down) when the closed captioning is enabled.

Figure 1A:
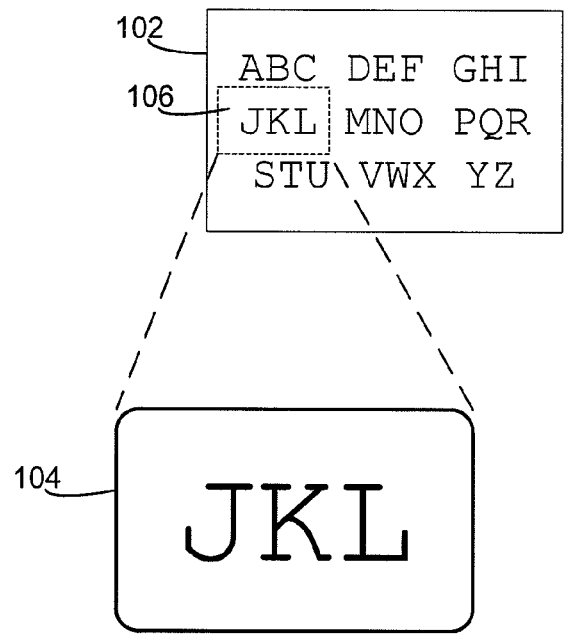
FIG. 1A is a diagram of a computer configured to display a magnified viewport of a computer desktop in which the viewport magnifies a first position on the computer desktop.
Figure 1B:
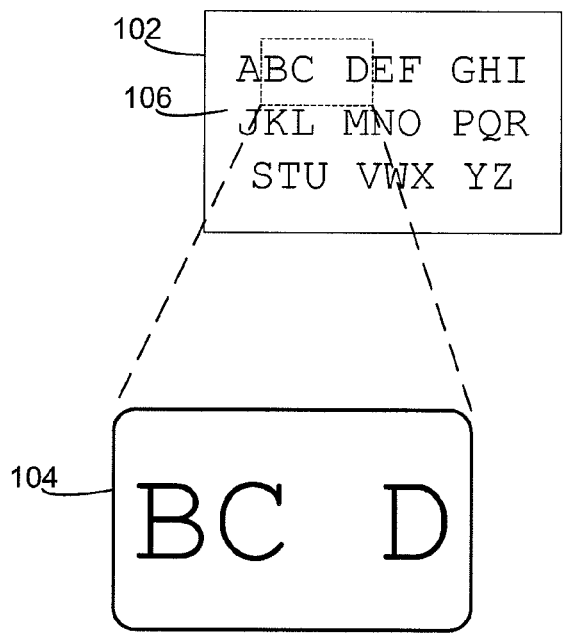
FIG. 1B is a diagram of a computer configured to display a magnified viewport of a computer desktop in which the viewport magnifies a second position on the computer desktop.
Figure 2:
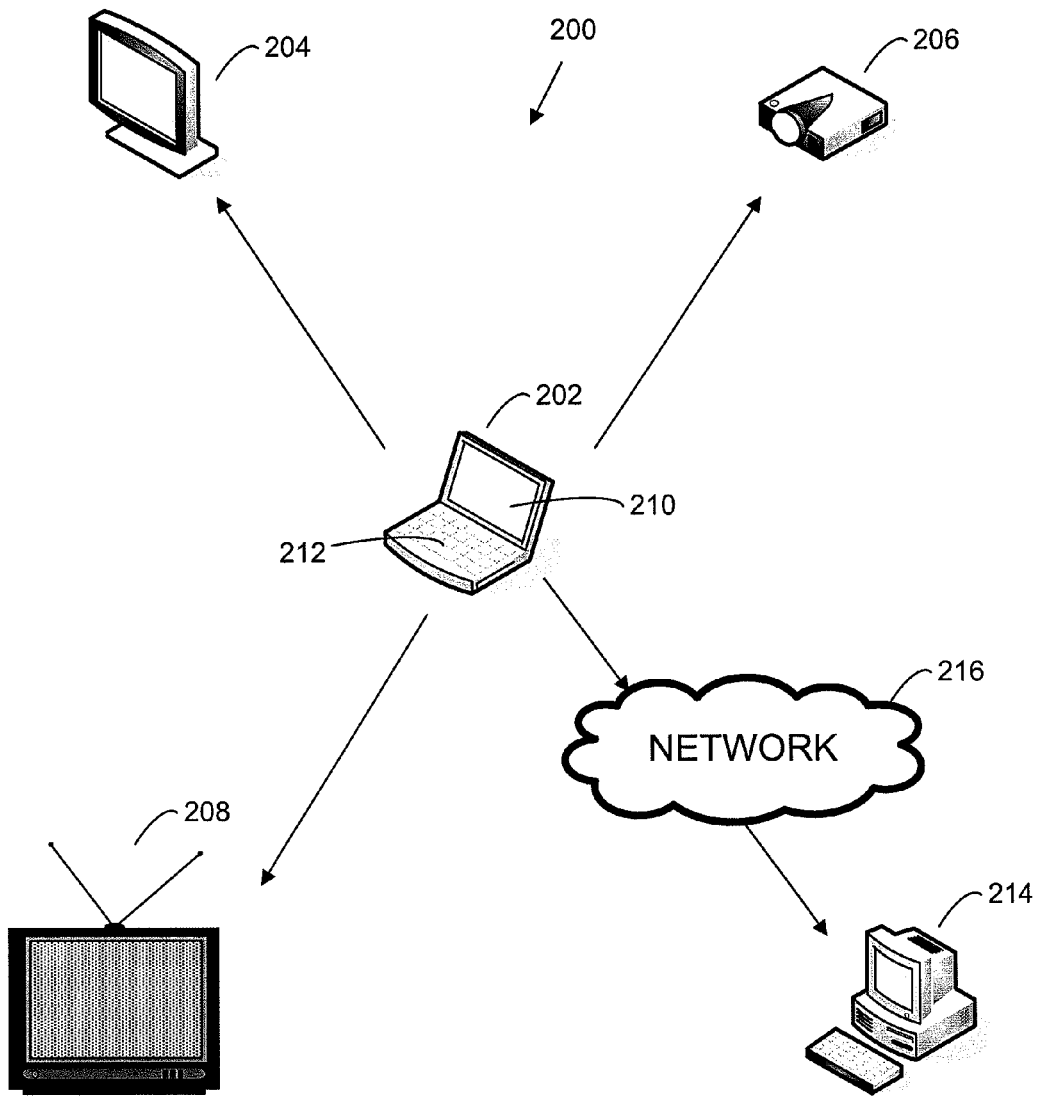
FIG. 2 is a diagram of a computer environment within which some embodiments of the invention may by implemented.

FIG. 2 is an architectural diagram of an environment 200 in which some embodiments of the invention may be implemented. Computer 202 may be connected to one or more display devices including, but not limited to external monitor 204, projector 206, or television 208. The one or more display devices may be external to computer 202, or they may be integrated with computer 202 such as integrated display 210. Computer 202 may also be connected with one or more input devices that may be external to computer 202, or integrated with computer 202 such as keyboard 212.

Computer 202 may communicate with remote computer 214 connected to computer 202 via network 216. Network 216 may be, for example, any suitable wired or wireless network and may be implemented as a private network (e.g., a local area network or intranet) or a public network (e.g., the internet) configured to enable computer 202 to communicate with remote computer 214.

Although computer 202 is illustrated as a laptop computer in exemplary computer environment 200, it should be appreciated that computer 202 may alternatively be implemented as any suitable type of computing device including, but not limited to a desktop computer, server computer, cell phone, smart phone, PDA, or thin client, and embodiments of the invention are not limited in this aspect.

Computer 202 may be configured to display visual content from a computer desktop for computer 202 on one or more the display devices in computer environment 200. Although the embodiments described below relate to partitioning a display area of a single display device for displaying closed-captioning content in one portion of the display area and at least a portion of a computer desktop in a second portion of the display area, in embodiments employing multiple display devices, it should be appreciated that either or both of the closed-captioning content and the at least a portion of the computer desktop may be displayed on one or multiple of the display devices connected to computer 302. Additionally, computer 202 may be configured to receive information from one or more of the computing devices in environment 200 to display visual content on one or more of the connected display devices.

Figure 3:
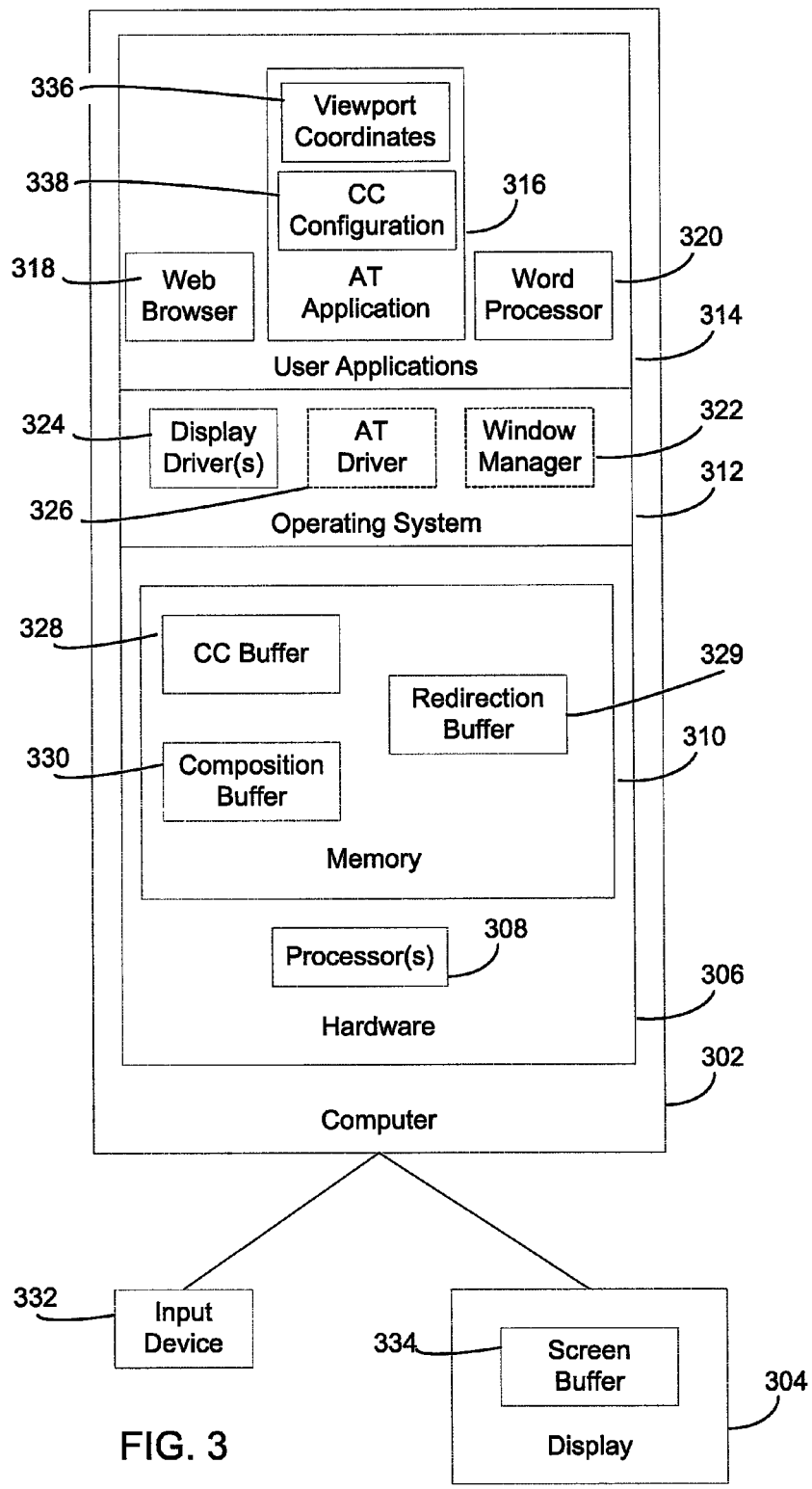
FIG. 3 is a block diagram of a computer connected to a display device for use with some embodiments of the invention.

FIG. 3 is a block diagram of a computer 302 coupled to display device 304. Computer 302 may be any suitable type of computer, such as that described in connection with computer 202 of FIG. 2. Similarly, display device 304 may be any suitable display device including, but not limited to, any of the display devices (i.e., elements 204, 206, 208, and 210) shown in FIG. 2.

Computer 302 may be implemented using any suitable combination of hardware and software. For example, computer 302 may include hardware 306, such as one or more processors 308 and memory 310. Processor(s) 308 may be of any suitable number and instruction architecture including, but not limited to, RISC, CISC, ARM, or Atom. Memory 310 may be any suitable type of tangible volatile or non-volatile data storage including, but not limited to, RAM, ROM, flash memory, hard disk, magnetic disk, optical disk, another type of tangible data storage medium, or any suitable combination thereof.

Computer 302 may also comprise software including, but not limited to, operating system 312 and user applications 314. Although operating system 312 and user applications 314 are illustrated as being separate from memory 310, it should be appreciated that operating system 312 and/or user applications 314 may be stored in memory 310 and/or may be stored in different types of memory depending on the current execution state of the software.

Operating system 312 may be configured to execute on hardware 310 and may be implemented as any suitable operating system, such as a variant of Microsoft Windows™, Mac OS X, Linux, UNIX, and operating systems intended for mobile or embedded devices, or any other suitable operating system. User applications 314 may be configured to execute on hardware 310 through one or more interfaces provided by operating system 312. In some embodiments, user applications 314 include Accessibility Technologies (AT) application 316. User applications 314 may also include other types of applications such as web browser 318, word processor 320.

Operating system 312 may comprise window manager 322 that is configured to manage the composition and rendering of windows on a computer desktop. Window manager 322 may be implemented in any suitable way and may execute in either kernel or user space. Operating system 312 may also include one or more display driver(s) 324 configured to interface with display device 304. Computer 302 may also comprise AT driver 326 configured to operate in combination with AT application 316 to modify the content displayed on display device 304. Although AT driver 326 is illustrated as a component of operating system 312, in some embodiments, AT driver 326 may be installed separately from operating system 312, but may execute in kernel address space with other operating system components. Window manager 322 and AT driver 326 are illustrated in FIG. 3 as having dashed borders to signify that they may not be included in some embodiments.

Memory 310 comprises CC buffer 328, redirection buffer 329, and composition buffer 330, each of which is implemented as a portion of memory 310 allocated as an off-screen surface on which to draw visual content to be displayed on a display device. CC buffer 328, redirection buffer 329, and composition buffer 330 may be accessible from either or both of kernel address space and a user address space. Each of the buffers in memory 310 may also be accessible from components of operating system 312, a user application 314 (e.g., AT application 316), or any combination thereof. Once drawn and configured, one or more of buffers in memory 310 may be copied to screen buffer 334 to be displayed on display 304 as described in more detail below. While CC buffer 328, redirection buffer 329, and composition buffer 330 are illustrated as being separate memory buffers, some embodiments may employ less than three buffers (e.g., a single buffer or two buffers) in the place of CC buffer 328, redirection buffer 329, and composition buffer 330.

Computer 302 may be connected to one or more input device(s) 332, which may be any suitable type of input device including, but not limited to, a mouse, keyboard, stylus, microphone, pointing device, touch screen, Braille keyboard, or Braille display, or any combination thereof. Input device(s) 332 may be integrated in the same enclosure as computer 302 or may be external to but otherwise coupled computer 302 (e.g., via a wired or wireless connection).

As described above, display device 304 may comprise screen buffer 334 (also sometimes referred to as a "frame buffer") which may be accessible (e.g., through memory mapping) to components in operating system 312 or one or more user applications 314 including AT application 316. In some implementations, the content of screen buffer 334 may correspond to the actual content displayed on display device 304.

Computer 302 may be configured to enhance a viewport of the computer desktop, such as by performing magnification of the viewport, and to display the enhanced viewport on display device 304. Accordingly, AT application 316 may include viewport configuration 336. Viewport configuration 336 may include, for example, current viewport coordinates that define the current viewport boundary, current magnification level of the viewport, and other viewport settings.

Computer 302 may also be configured to display closed-captioning content on display device 304. Accordingly, AT application 316 may include CC configuration 338. CC configuration 338 may include one or more settings for characteristics of closed-captioning content such as font size, font style, color scheme, highlighting scheme, replacement scheme, or other closed-captioning settings. In some embodiments, a user of computer 302 may adjust one or more settings of CC configuration 338 by interacting with a user interface included as a portion of AT application 316 and displayed on display device 304. The user interface for adjusting settings in CC configuration 338 may be designed in any suitable way to enable a user to adjust some or all of the settings in CC configuration 338.

When AT software including AT application 316 and/or AT driver 326 is not being employed to modify contents displayed on display device 304, an application, such as one of user applications 314, desiring to display visual content on display device 304 may typically do so using an interface provided by operating system 312. Upon receiving an instruction via the interface to display visual content, operating system 312 may copy the visual content directly to screen buffer 334, thereby displaying the visual content on a display area of display device 304. However, in some operating system configurations, upon receiving an instruction via the interface to display visual content, operating system 312 may first write the visual content to a buffer, sometimes known as a "back buffer." A component of operating system 312 (e.g., window manager 322) may perform one or more transformations on the visual content in the back buffer, such as applying translucent or transparent effects, and then copy the data from the back buffer to screen buffer 334, which allows display device 304 to display the transformed visual content.

According to some embodiments, when AT software is configured to enhance a portion of visual content before displaying that enhanced visual content on display device 304, the portion of the visual content may first be enhanced by the AT software before operating system 312 copies the content to the back buffer or screen buffer 334. In some embodiments, upon receiving an instruction to display visual content from one of user applications 314, operating system 312 may be caused to copy the visual content to redirection buffer 329 rather than to the back buffer or to screen buffer 334.

In some embodiments, the AT software may then copy the portion of the visual content that is configured to be enhanced from redirection buffer 329 to composition buffer 330. The visual content in composition buffer 330 may then be enhanced, such as, for example, through magnification. In some embodiments, a portion of the visual content may be enhanced and copied simultaneously or near simultaneously and aspects of the invention are not limited in this respect. Visual content from redirection buffer 329 may be copied to composition buffer 330 and enhanced at periodic intervals or as the result of a notification that visual content in redirection buffer 329 has changed. Moreover, it should be appreciated that some embodiments may not use a separate redirection buffer 329 and composition buffer 330. For example, in some embodiments, visual content may be enhanced directly in redirection buffer 329. The actual enhancement processing may be carried out in any suitable way, including by any suitable combination of hardware or software. In some embodiments, the enhancement may be performed by AT driver 326 and/or AT application 316. The enhancement may alternatively or additionally be performed in dedicated hardware, such as in a graphics processing unit in hardware 306. Such dedicated graphics processing hardware may be accessible to computer 302 in any suitable way. For example, the dedicated hardware may be integrated on a system board of computer 302 (e.g., "motherboard") or it may be on a separate circuit board such as a graphics adapter card that is electrically coupled to the system board.

Regardless of the specific manner in which enhancement processing is performed, the AT software or window manager 322 may instruct operating system 302 to copy the enhanced visual content in composition buffer 330 to screen buffer 334 for display onto display device 304. In some embodiments, CC buffer 328 may be composed with desktop content from redirection buffer 329 (and any other buffers) into composition buffer 330 prior to copying composition buffer 330 to screen buffer 334. Instructing operating system 302 to copy the visual content in one or more buffers in memory 310 to screen buffer 334 may be performed in any suitable way. For example, in some embodiments, the AT software may issue a function call to display driver 324 which may use a component of the operating system 312 such as DirectX to copy the visual content from composition buffer 330 to screen buffer 334. In other embodiments, composition buffer 330 may actually be the "back buffer," discussed above. In such embodiments, the AT software or window manager 322 may issue an instruction through an interface with a component of operating system 312 (e.g., DirectX) to display content from the back buffer on the display device 304.

In some embodiments in which CC buffer 328 is copied to a portion of composition buffer 330 prior to copying composition buffer 330 to screen buffer 334, the size of the destination area in composition buffer 330 to which the CC buffer 328 is copied may change in accordance with changes in the size of the CC buffer that includes closed-captioning content. As described in more detail below, the relative size of the two portions of the partitioned display may change in response to changing at least one characteristic (e.g., font size) of the closed-captioning content, and the respective sizes of the source and destination areas in composition buffer 330 for the CC buffer 328 and the portion of redirection buffer 329 that includes desktop content may be changed accordingly.

Some specific implementations of redirecting visual content to be displayed on a computer desktop will be described followed by a description of implementations of capturing and displaying closed-captioning content on a dedicated portion of the display.

In a first implementation for redirecting visual content to be displayed on the computer desktop, sometimes referred to as driver chaining or driver interception, AT driver 326 may insert itself in a driver stack of operating system 312 above display driver(s) 324, so that display driver calls intended to be received and processed by display driver(s) 324 are effectively intercepted by AT driver 326. The driver interception may be performed in any suitable way. For example, driver entry points in a table of function pointers for display driver(s) 324 may be modified to point to functions in AT driver 326. Some operating systems such as variants of Microsoft Windows may provide an API to register a driver as part of a display driver chain.

Upon intercepting a driver call, AT driver 326 may perform some initial processing. For example, AT driver 326 may replace a value for a pointer variable (sometimes referred to as a "surface pointer") that is expected to point to screen buffer 334 to instead point to redirection buffer 329. For at least some intercepted calls, AT driver 326 may perform some initial processing and then make the appropriate driver call in underlying display driver(s) 324. Such underlying driver calls may be made with modified actual function parameters. For example, a parameter value for the surface pointer may be modified to point to redirection buffer 329. This has the effect of causing visual content to be written to redirection buffer 329 rather than being written directly to screen buffer 334. The AT software (e.g., AT application 316 and/or AT driver 326) may then copy the appropriate portion of visual content that will be enhanced from redirection buffer 329 to composition buffer 330. The visual content in composition buffer 330 may then be enhanced, as discussed above. After the enhancement processing, a driver call, such as DrvCopyBits( ) in variants of the Windows operating system, or other driver calls in other operating systems, may be transmitted to display driver(s) 324 to instruct it to copy visual content from composition buffer 330 to screen buffer 334. This driver call may be made in any suitable way. In some embodiments, AT application 316 may issue a "driver escape" to allow it to issue the appropriate call into display driver(s) 324.

A second possible implementation may be used in operating systems (e.g., variants of Microsoft Windows) that support a capability sometimes called "layered windows." When an operating system provides layered windows capability, visual content is first drawn to a redirection buffer configured by the operating system, thereby allowing the operating system to provide effects such as transparency to be applied across different application windows before the operating system causes visual content to be displayed on display device 304. Thus, in these embodiments, operating system 312 may itself create redirection buffer 329.

In some embodiments, AT software may create a new layered window (referred to hereafter as "AT layered window") to represent the enhanced visual content that may be displayed on display device 304. The AT layered window may be configured to be the top window and to occupy all of the display area of display device 304. In operating systems that provide a capability to control the opacity of layered windows, the AT layered window may be configured to be fully opaque. In some embodiments, the visual content of windows of user applications 314 or windows of components of operating system 312 are drawn in redirection buffer 329. Typically, the AT layered window may not contain any content until the AT software has drawn visual content into the AT layered window.

In some embodiments, AT software may query operating system 312 for the contents of redirection buffer 329. This may be done in any suitable way. For example, operating system 312 may be queried at fixed intervals and/or as the result of a notification that the content in redirection buffer 329 has changed. In some embodiments, AT application 316 may issue a call to operating system 312 through a published API provided by operating system 312 to retrieve the contents of redirection buffer 329 with the exception of the contents of the AT layered window. Thus, AT application 316 may obtain through the published API visual content for the portion of redirection buffer 329 that corresponds to viewport settings 336, and may copy such visual content to composition buffer 330. AT software may enhance the visual content in any suitable way, as discussed above. For example, in some embodiments, the content may be enhanced simultaneously with copying the content into composition buffer 330, although aspects of the invention are not limited in this respect.

After the visual content in composition buffer 330 has been enhanced, the AT software may notify operating system 312 to copy the contents of composition buffer 330 to screen buffer 334. This may be done in any suitable way. In some embodiments, AT application 316 may issue a call to operating system 312 to invalidate the AT layered window. This may cause operating system 312 to send a "paint message," which allows the AT software to draw the contents of composition buffer 330 into the AT layered window, thereby allowing operating system 312 to copy the contents of the AT layered window to screen buffer 334 and display them on display device 304. Alternatively, some operating systems may provide an API to copy a buffer for a layered window, thereby allowing AT software to copy the contents of composition buffer 330 into the AT layered window. As a third alternative, some operating systems may support associating the AT layered window with a hardware acceleration technology, such as DirectX. If the AT layered window is initialized to use a hardware acceleration technology (DirectX, for example), the AT software may call a DirectX routine to write composition buffer 330 to the AT layered window. DirectX may then, through hardware assistance, copy the contents of the AT layered window to screen buffer 334 for display onto display device 304.

A third possible implementation may be used in operating systems that provide a window manager, such as window manager 322, that acts as a composition engine (e.g., applying special effects, translucency, transparency, etc.) for multiple windows to be displayed on a display device. Examples of such a window manager may be the Desktop Window Manager included in variants of Microsoft Windows and the Quartz Compositor included in variants of Mac OS X.

According to this third implementation, user applications 314 draw their visual content into application windows using standard APIs (e.g., GDI) and kernel parts of the graphics system redirect the drawing to an off-screen buffer (e.g., a back buffer) corresponding to the window that the application is drawing into. Window manager 322 may then receive a notification that some visual content should be displayed on the desktop and window manager 322 may re-compose the visual content, such as applying transparency effects, across various application windows. After re-composing the back buffer, window manager 322 may write the contents of the back buffer to screen buffer 334, thereby allowing display device 304 to display the contents of the screen. This may be done in any suitable way. In some implementations of window manager 322, such as that in variants of the Microsoft Windows operating system, windows manager 322 may issue a Present( ) function call provided by a DirectX object in window manager 322, which may "flip" the contents of the back buffer and screen buffer 334 (i.e., the contents of the back buffer may be written to screen buffer 734, and the newly written contents of screen buffer 334 may become the new contents of the back buffer).

When AT software is configured to enhance the visual content to be displayed, however, window manager 322 may be caused to redirect visual content updates or other visual content to redirection buffer 329 provided by the AT software, rather than to the back buffer, as discussed above. Furthermore, when windows manager 322 issues the Present( ) or other function call that indicates drawing has been completed, such as the function call EndScene( ) rather than immediately executing the typical routine associated with the function call and implemented by DirectX, an implementation of the routine such as Present( ) provided by the AT software may instead be caused to be executed. Execution of the AT software Present( ) routine may result in a copy of any portions of visual content that correspond to the current viewport from redirection buffer 329 to composition buffer 330 and an application of enhancements, such as magnification, to the visual content in composition buffer 330. As described above, in some embodiments, enhancement may be applied simultaneously with copying visual content from the redirection buffer 329 to composition buffer 330 and aspects of the invention are not limited in this respect. Other buffers (including CC buffer 328) may additionally be copied to composition buffer to be displayed on the screen. In some embodiments, composition buffer 330 may be the back buffer into which window manager 322 would typically render visual content when the AT software is not configured to enhance the content. The enhancement processing may be performed in any suitable way, as discussed above. In some embodiments, at least some of the enhancement may be performed using hardware acceleration, such as that provided via a DirectX interface. After performing the enhancement processing, the AT software may call the implementation of the Present( ) routine provided by DirectX, thereby writing the contents of composition buffer 330 into screen buffer 334.

A process for selecting and processing closed-captioning content in accordance with some embodiments of the invention is now described. Closed-captioning content may written to CC buffer 328 via one or more APIs configured to interface with operating system 312 and/or user applications 314 including AT application 316. For example, AT application 316 may issue a call to a user application 314 through an API to capture closed-captioning content from the user application. Depending on the particular implementation and/or one or more stored closed-captioning parameters, the API may extract from the user application, different content to be displayed as closed-captioning content. For example, if closed-captioning content to be displayed is help information associated with a particular desktop object over which a user has moved the mouse cursor, the API may capture attribute information associated with the desktop object and/or stored help information relating to the desktop object. As described below, some applications are configured to display "balloon help" when a user moves the mouse cursor over a particular object. For such applications, the API may intercept display calls to display driver 324 to display the help information to the desktop and at least some of the help information may be written to CC buffer 328. It should be appreciated that the above-described example related to displaying help information as closed-captioning content is merely provided for illustration and other techniques for capturing closed captioning information from operating system 312 and/or user applications 314 are also contemplated.

After the AT software has employed one or more APIs to capture the closed-captioning information from operating system 312 and/or user applications 314, the captured closed-captioning content may be processed by the AT software (e.g., AT driver 326) to filter the captured closed-captioning information and/or to place the closed-captioning information in a particular format for display. Although the captured data may be processed in some embodiments, in other embodiments, the closed-captioning content may be directly written to CC buffer 328 without any intervening processing by the AT software and embodiments of the invention are not limited in this respect.

As described above, once the closed-captioning content is written to CC buffer 328, the closed-captioning content may be displayed on a portion of a partitioned display using any suitable technique. For example, the CC buffer 328 may be copied to a portion of composition buffer 330 prior to composition buffer 330 being copied to screen buffer 334 of display 304. Alternatively, screen buffer 334 may itself be partitioned, and CC buffer 328 may be directly copied to a portion of screen buffer 334 dedicated to displaying the closed-captioning content. Regardless of how the closed-captioning content in CC buffer is ultimately displayed on display 304, any of the aforementioned implementations (or any other suitable implementations that are not explicitly described above) for displaying at least a portion of a computer desktop on display 304 may be used in combination with displaying the closed-captioning content and embodiments of the invention are not limited in this respect.

Figure 4:
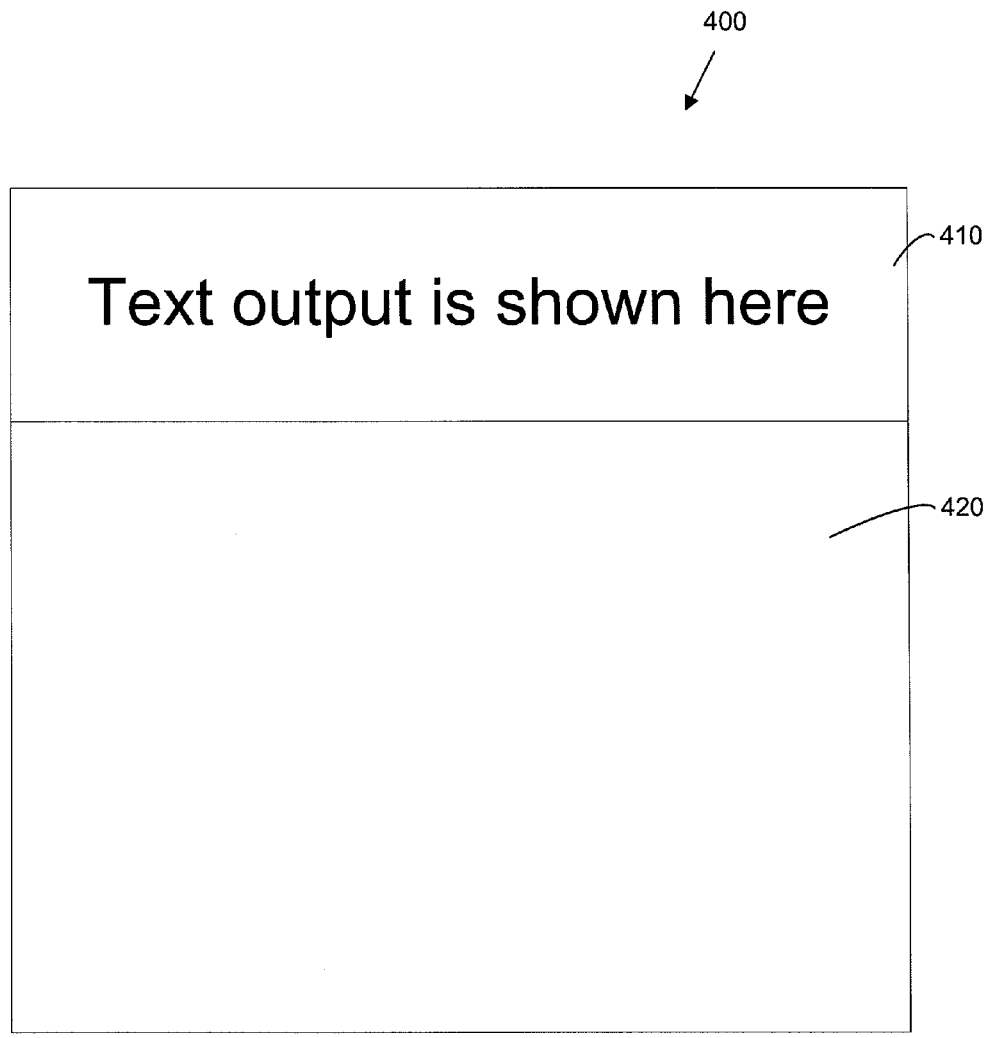
FIG. 4 is a diagram of a partitioned display area of a display device in accordance with some embodiments of the invention.

FIG. 4 illustrates a display area 400 of a display device in accordance with some embodiments of the invention. Display area 400 is partitioned into a first portion 410 configured to display closed-captioning content and a second portion 420 configured to display a computer desktop. The computer desktop displayed in second portion 420 may be an unmagnified copy of the computer desktop, or alternatively, second portion 420 may display a magnified portion of the computer desktop in accordance with a selected viewport. Characteristics of the closed-captioning content (font size, color, etc.) displayed in the first portion 410 and properties of the computer desktop (magnification, viewport coordinates, etc.) displayed in the second portion 420 may be independently configurable and controllable by a user of a computer connected to the display device.

Closed-captioning content that may be displayed in first portion 410 of partitioned display area 400 includes, but is not limited to, font characteristics for text displayed on the desktop, window title information, information from user applications provided by one or more APIs, information or meta-information about desktop elements that are "in focus," text that is typed in a document (e.g., displayed in a word processing application), help information for a desktop or user application element, alert information provided by the computer system, and information redirected for output by a speech synthesizer. These types of closed-captioning content and others, may be particularly beneficial to impaired- and low-vision users by enabling such users to focus on information of interest without having to identify and magnify individual portions of a computer desktop displayed on a display device.

It should be appreciated that some APIs may be specifically designed for use with a particular application, whereas other APIs, sometimes known as general accessibility APIs or user interface reflectors, may be configured to capture closed-captioning content from a plurality of different applications that do not require a customized API. Additionally, some APIs may write closed-captioning content directly to a screen buffer of a display device rather than writing the content to an off-screen buffer and embodiments of the invention are not limited in this respect. Further discussion of exemplary types of closed-captioning content and ways in which the closed-captioning content assist low-vision users of AT software is provided below.

Second portion 420 may also be configured to enable a user to scroll the contents of second portion 420 to navigate to other parts of the desktop not currently displayed in second portion 420. In some embodiments, a user may scroll the contents of second portion 420 using mouse movements and/or by using one or more keys on a keyboard. However, it should be appreciated that the user may scroll the contents of second portion 420 in any suitable way and embodiments of the invention are not limited in this respect. For example, in some embodiments, a user may scroll the contents of second portion 420 by moving a scroll bar displayed on the second portion 420. Additionally, although first portion 410 is shown positioned above second portion 420, it should be appreciated that display area 400 may be partitioned in any suitable way. For example, first portion 410 may be displayed below second portion 420.

The size of first portion 410 and second portion 420 may be adjusted based, at least in part, on one or more characteristics of the closed-captioning content displayed in first portion 410. For example, increasing a font size of the closed-captioning content may result in the size of first portion 410 to increase and the size of second portion 420 to decrease. In some embodiments, the amount to which the size of first portion 410 may be increased may be limited to, for example, 33% or 50% of the entire display area 400. By limiting the maximum size of first portion 410, the amount of display area 400 that is reserved to display the computer desktop may remain large enough to be effectively used.

By partitioning display area 400 into distinct and non-overlapping portions, the closed-captioning content displayed in first portion 410 may not obscure the visual content of the computer desktop displayed in second portion 420. That is, although part of the desktop may not be visible in second portion 420, it is not obscured by first portion 410 because a user may scroll to the portion of the desktop that is not currently visible. Thus, rather than merely covering visual content display on a portion of the desktop with an opaque text box showing closed-captioning content, some embodiments of the invention display the closed-captioning content in a separate non-overlapping portion of the display area which does not obscure visual content displayed on the computer desktop. Although the exemplary display area 400 is shown as being partitioned into two portions, it should be appreciated that the display area may be partitioned into more than two portions and embodiments of the invention are not limited in this respect. For example, the second portion 420 of display area 400 may further be divided into two portions with one portion displaying a magnified view of a desktop in accordance with a viewport and another portion displaying an unmagnified view of the desktop.

Figure 5:
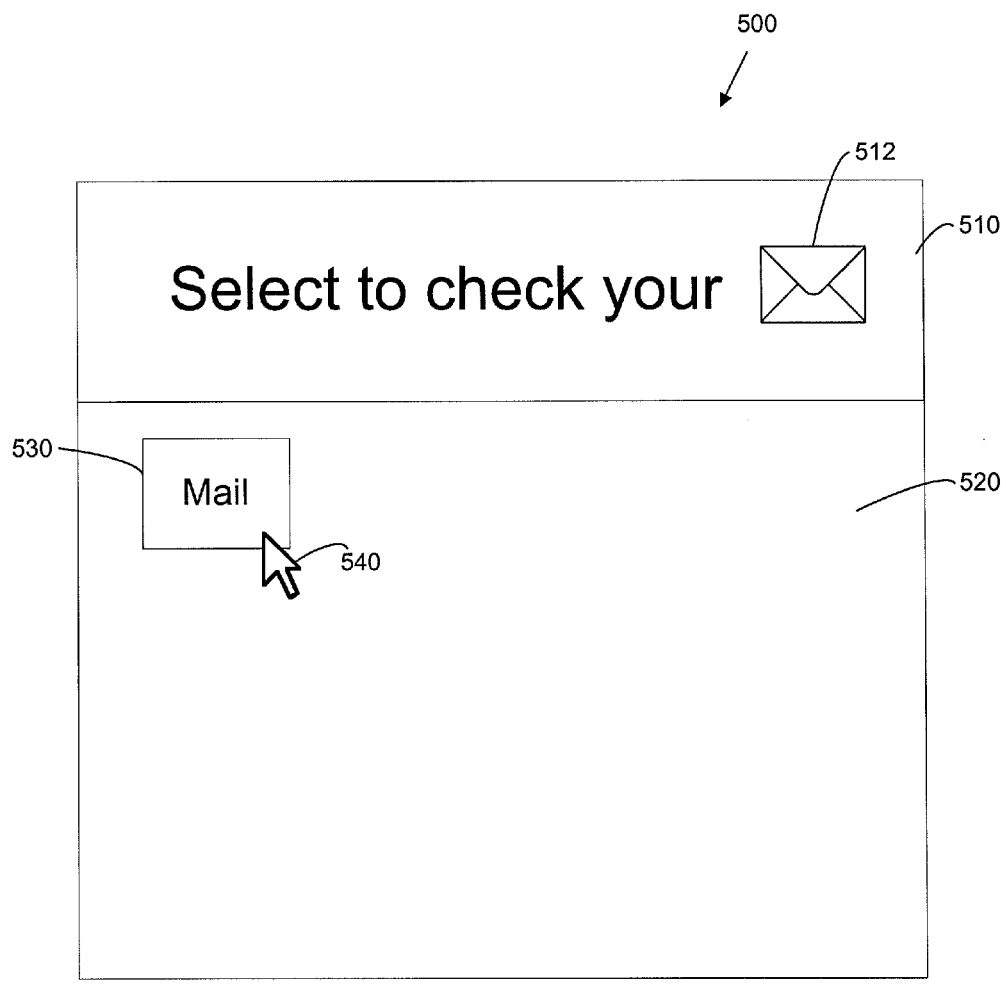
FIG. 5 is a diagram of a partitioned display area in which some content displayed in a first portion of the display area is replaced with a symbol in accordance with some embodiments of the invention.

FIG. 5 illustrates another display area 500 of a display device in accordance with some embodiments of the invention. Display area 500 has been partitioned into first portion 510 and second portion 520. As discussed previously in connection with display area 400, first portion 510 is configured to display closed-captioning content that relates to one or more user interactions with the computer desktop displayed in second portion 520. However, unlike the closed-captioning content shown in first portion 410 of display area 400, at least some of the closed-captioning content displayed in first portion 510 of display area 500 has been replaced with symbol 512 to facilitate a user's understanding of the closed-captioning content.

In the example shown in FIG. 5, computer desktop may include mail button 530 that, when activated, checks if a user has received email. In some embodiments having closed captioning enabled, when a selector such as mouse cursor 540 is moved over an element (e.g., mail button 530) of the computer desktop displayed in second portion 520, closed-captioning content is displayed in first portion 510 indicating a functionality of the element. For example, if a user moves mouse cursor 540 over mail button 530, the closed-captioning content "Select to check your mail" may be displayed in first portion 510. Alternatively, in some embodiments described in more detail below, at least some text in the closed-captioning content displayed in first portion 510 may be replaced by symbol 512 depending on the context attributed to the text to be replaced. In the example of FIG. 5, the word "mail" is replaced by "envelope" symbol 512, which may facilitate a user's understanding that mail button 530 corresponds to checking email.

Figure 6:
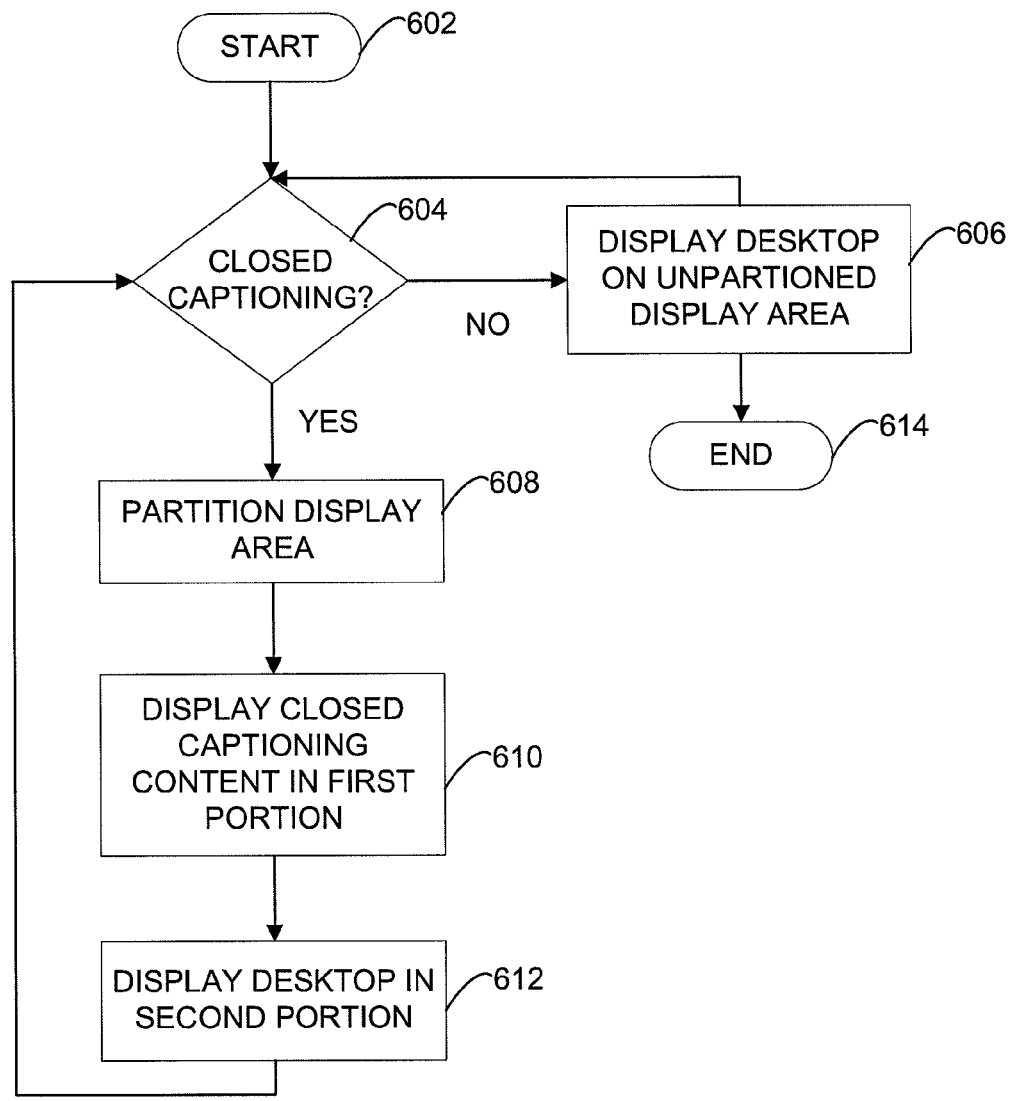
FIG. 6 is a flowchart of a process for partitioning a display area into multiple portions for displaying closed-captioning content in accordance with some embodiments of the invention.

FIG. 6 depicts a series of acts in a computer-implemented process for partitioning a display area for closed captioning in accordance with some embodiments of the invention. In act 602 the process begins and in act 604 a determination is made regarding whether closed captioning is desired. The determination of whether closed captioning is desired may be made in any suitable way. For example, a user may indicate that closed captioning is desired by providing one or more input signals to the computer via an input device such as a mouse or keyboard. In some embodiments, one or more keys on a keyboard may be programmed as "hotkeys" which, when pressed, enable the closed captioning functionality by sending an instruction to at least one processor in the computer. Closed captioning may also be enabled, in some embodiments, by selecting closed captioning from a drop down menu or other type of selection menu displayed on the computer desktop displayed on the display area. In embodiments in which speech may be received as input to the computer, closed captioning may be enabled by recognizing an associated voice command input by a user. As should be appreciated from the foregoing, any suitable type of input from a user may be used to enable/disable closed captioning and embodiments of the invention are not limited by the particular implementation.

If it is determined in act 604 that closed captioning is not desired, the computer desktop is displayed on the unpartitioned display area of the display device. That is, when closed captioning is not enabled, the desktop (or a portion of the desktop that has been enhanced by AT software) may be displayed on the entire display area of the display device. However, if it is determined in act 604 that closed captioning is desired the process continues to act 608 where the display area may be partitioned so that a first portion of the display area is dedicated to displaying closed-captioning content and a second portion of the display area may be used to display at least a portion of the computer desktop. The display area may be partitioned in act 608 in any suitable manner and/or proportion and embodiments of the invention are not limited in this respect. In some embodiments, partitioning parameters indicating a font, font size, and/or partition size for the first portion of the display area configured to display closed-captioning content may be stored in memory of the computer. If it is determined in act 604 that closed captioning is desired, the display area may be partitioned in act 608 based, at least in part, on the partitioning parameters stored in memory. In some embodiments, the stored partitioning parameters may be user configurable so that different users may specify a particular style or closed-captioning scheme to use when closed-captioning is enabled.

Once the display area has been partitioned in act 608, the process continues to act 610 where closed-captioning content may be displayed in a first portion of the display area. In some embodiments, the closed-captioning content may be copied from a CC buffer in memory as described in more detail below. Alternatively, closed-captioning content may be displayed in the first portion of the display area without first being copied to a CC buffer, but instead may be copied to a screen buffer of the display device directly from AT software including an AT user application and/or an AT driver.

The process then continues to act 612, where the computer desktop (or an enhanced portion of the computer desktop) which was previously displayed on the entire display area may be displayed on a second portion of the partitioned display area. In the exemplary partitioned display area 400 shown in FIG. 4, the computer desktop is displayed in the second portion 420 of the display area which is positioned below the first portion 410 of the display area. However, it should be appreciated that the second portion configured to display the desktop area may alternatively be positioned above the first portion configured to display the closed-captioning content and embodiments of the invention are not limited by the relative positions of the first portion and the second portion of the display area.

In addition to displaying the desktop in the second portion of the display area in act 612, the second portion of the display may be configured to enable a user to scroll to portions of the desktop that are not currently shown on the display area. As described above, scrolling the contents in the second portion of the display area may be implemented in any suitable way and embodiments of the invention are not limited in this respect. For example, a user may scroll the desktop displayed in the second portion of the display area by moving the mouse cursor against a top or bottom edge of the second portion of the display area. Upon detection that the desktop is being scrolled, the desktop may be redrawn on the second portion as described above. In some embodiments, the desktop displayed in the second portion of the display area may be automatically scrolled in response to a changing focus on different parts of the desktop (also known as "focus tracking"). For example, as a user is reading text in a word processing document, the contents displayed in the second portion of the display area may automatically scroll at a fixed or variable rate.

One way to display the desktop in the second portion of the display area after partitioning is to reduce the scaling of the information on the desktop so the entire desktop can be viewed in the second portion at once. However, the inventors have recognized that reducing the scaling of information on the desktop may not be desired by users with low vision who use AT software to magnify portions of the desktop for improved visibility. Thus, in some embodiments, the scaling of the information on the desktop (or portion of the magnified desktop) is unchanged following partitioning of the display area. By implementing scrolling as an interactive component of the second portion of the display area, a user may use an input device to scroll to other portions of the desktop not currently in view.

The portion of the desktop that is displayed following partitioning of the display area (and correspondingly, which portion of the desktop must be scrolled to for viewing) may vary depending on a particular implementation and embodiments of the invention are not limited in this respect. In a first implementation shown in FIG. 4, a lower portion of the desktop may be displayed in a second portion 420 of display area 400 after partitioning of display area 400. In such an implementation, a user may scroll the desktop to view an upper portion of the desktop that is initially hidden from view. In a second implementation shown in FIG. 5, an upper portion of the desktop may be displayed in the second portion 520 of display area 500 after partitioning of display area 500. In such an implementation, a user may scroll the desktop to view a lower portion of the desktop that is initially hidden from view.

In yet another implementation (not shown), the portion of the desktop that is displayed after partitioning of the display area may be a middle portion of the desktop and a user may scroll either up or down to view the portions of the desktop that are initially hidden from view. A determination about which portion of the desktop to display in the second portion of the partitioned display area may be made based, at least in part on stored partitioning parameters or may be made in any other suitable way that may or may not be user configurable.

Upon displaying at least a portion of the desktop in the second portion of the partitioned display area in act 612, the process may return to act 604 where it may be determined if a user desires to continue the display of closed-captioning content. For example, in some embodiments, a user may want to disable closed captioning functionality after it has been enabled, so that the desktop is displayed on an unpartitioned display area. A desire to disable closed captioning may be determined in any suitable way. For example, a user may press one or more hotkeys on a keyboard or other input device to instruct the computer to disable closed captioning. Alternatively, in embodiments which comprise a speech input capability, a voice instruction to disable closed captioning may be recognized and used to instruct at least one processor of the computer to inform the AT software to disable closed captioning.

In response to disabling closed captioning in act 604, the desktop that was previously displayed in the second portion of the partitioned display area may be displayed on an unpartitioned display area so that the entire desktop (or enhanced portion of the desktop) may be viewed without having to scroll to different portions of the desktop that are hidden from view. In some embodiments, a user may toggle between different states having closed captioning enabled or disabled by pressing one or more hotkeys or providing another appropriate input signal to the at least one processor of the computer. The at least one processor upon receiving the input signal(s) may instruct the AT software to enable/disable closed captioning accordingly. After displaying the desktop on an unpartitioned display area in act 606 (or alternatively, after displaying the desktop in the second portion of the partitioned display area in act 614), the process ends in act 614.

Figure 7:
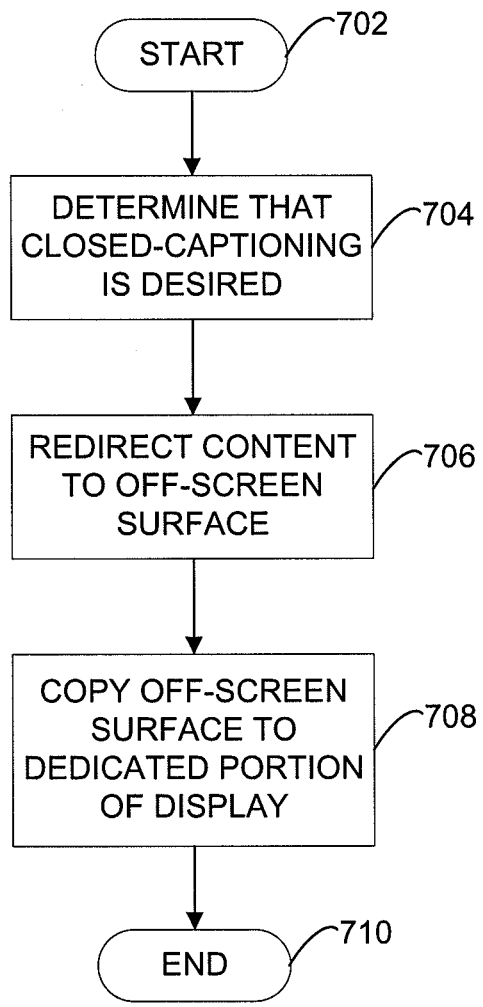
FIG. 7 is a flowchart of a process for updating a portion a display area with closed-captioning content in accordance with some embodiments of the invention.

FIG. 7 illustrates a process for displaying closed-captioning content in a dedicated portion of a partitioned display area in accordance with some embodiments of the invention. For example, the process in FIG. 7 may be employed at act 610 of FIG. 6 to render closed-captioning content in the dedicated portion of a partitioned display. In act 702 the process begins and in act 704 it is determined that closed-captioning is desired. The determination of whether closed captioning is desired may be made using one or more of the methods described above in connection with the process of FIG. 6 (e.g., detecting that a user has pressed a specific hotkey), or may be made using any other suitable techniques.

After it has been determined in act 704 that closed captioning is desired, at least some content from the desktop and/or one or more user applications is written to an off-screen surface in act 706. For example, an API (e.g., an accessibility API provided by AT software) may be configured to capture closed-captioning content from the desktop and/or user applications and to write the closed-captioning content to the CC buffer that is used to construct and configure a portion of the display area dedicated to displaying closed-captioning content as described above. An AT driver associated with the API and/or at least one processor of the computer may process at least some of the captured closed-captioning content (e.g., to filter the content or put the content into a proper format) prior to writing the closed-captioning content to the CC buffer.

Some specific types of information that may be captured and written to the CC buffer as closed-captioning content in accordance with some embodiments of the invention are described in more detail below.

At least some of the content that has been written to the CC buffer may be copied to a dedicated portion of a partitioned display area in act 708. Copying the closed-captioning content in the CC buffer to a portion of the display area may be performed in any suitable way. For example, the CC buffer may be copied to a portion of the composition buffer stored in memory prior to the composition buffer being copied to the screen buffer of a display device. In such an implementation, the composition buffer may include both the closed-captioning content and the enhanced (or unenhanced) computer desktop content. Alternatively the screen buffer itself may be partitioned, so that the CC buffer including the closed-captioning content is copied to a first part of the screen buffer and the composition buffer including the enhanced (or unenhanced) computer desktop content is copied to a second portion of the screen buffer. Regardless of the particular implementation used to write the closed-captioning content and the computer desktop content to the screen buffer, the process then continues to act 710 where the contents of the screen buffer may be displayed on the display area of the display device.

Closed-captioning content in accordance with some embodiments of the invention may be selected or generated "on-the-fly" as a user is interacting with a user interface displayed on a computer, rather than being predetermined and/or pre-stored in memory. Allowing closed-captioning content to be selected or generated in response to a user's actions results in a flexible closed-captioning method capable of considering context and other factors to provide an enhanced closed-captioning display.

In some embodiments, an AT application may include computer-executable instructions to configure one or more hotkeys to begin capturing closed-captioning content from a user application or desktop upon activation (e.g., by pressing a button or via speech input) of the one or more hotkeys. For example, one hotkey may be configured to provide font information via an accessibility API for display in a first portion of a partitioned display area, whereas another hotkey may be configured to provide information about the title of a currently active window displayed on the desktop by capturing information from a windows manager. Other hotkeys and corresponding information are also contemplated by some embodiments of the invention and are not limited by the particular hotkeys described herein.

In some embodiments the closed-captioning content captured by an API and displayed in a portion of a partitioned display area may reflect one or more processes occurring in a particular window on the desktop that is active or considered to be "in focus." That is, the closed-captioning content may change in response to a user moving a text cursor between windows displayed on the desktop. When the focus is on a particular window, an accessibility API may collect meta-information about the window and write at least some of the meta-information to an off-screen surface to be displayed as closed-captioning content. For example, when a window is selected, information about particular controls in the window including a label (e.g., control name), type (e.g., radio button, check box), status (e.g., enabled, disabled, checked), and/or value of the control (e.g., text in a text box) may be captured by an API and displayed as closed-captioning content. By providing users with at least some of this information via closed captioning, the user may be able to react accordingly depending on which window is currently in focus.

In some embodiments, text that is typed in a document displayed on the desktop may be selected as closed-captioning content by an accessibility API, and the typed text may be written to an off-screen buffer or a screen buffer of a display device. One or more transformations of the text may be performed in the off-screen buffer in order to highlight aspects of the text that may need correction. For example, possible word misspellings detected by a word processor application may be identified in the closed-captioning content by highlighting or underlining the possible misspelled word. Displaying the typed text in real-time as closed-captioning content may enable the user to quickly determine if a mistake has been made so that a correction can be performed.

Another benefit of displaying typed text as closed-captioning content for users with low-vision includes the ability of such users to view a desktop having lower magnification on one portion of the display area and a display of what they are typing in a font having a larger size or type as the closed-captioning content. By providing a "zoomed-out" view of the desktop in combination with a magnified view of what they are typing, low-vision users may be able to perceive both what they are typing and where the text fits within the larger context of the document.

In some embodiments, help information provided by the operating system and/or one or more applications may be selected as closed-captioning content by one or more APIs. For example, some applications provide "balloon help" functionality that displays help information when a user moves a mouse cursor over a particular object on the desktop. However, the font size for the help information in the balloon help may be small and the user may not be able to read it clearly. By displaying the help information as closed-captioning content, the user may be able to read the information more clearly than may be possible using a conventional help information display process. A process for capturing help information provided to the desktop may be implemented in any suitable way. For example, closed-captioning functionality implemented as a portion of an AT application may intercept display calls to display help information on the desktop and the help information that would have been displayed on the desktop may be written to an off-screen closed-captioning buffer as described above in connection with FIG. 7. After optionally modifying one or more characteristics of the content in the off-screen buffer, the off-screen buffer may be copied to the composition buffer (which is subsequently copied to the screen buffer of a display device) or a portion of the screen buffer of the display device to display the closed-captioning contents on a portion of the display area.

In some embodiments, closed-captioning content displayed in the dedicated portion of the display area may automatically scroll in a horizontal or vertical direction as additional content is copied to the screen buffer of the display device for display on a portion of the partitioned display area. Such scrolling may provide an effect similar to a teleprompter that enables the user to follow the progression of the closed-captioning content over time.

In some embodiments, alert information provided by the operating system and/or an application may be displayed as closed-captioning content. For example, if a user tries to save a document, but the computer system determines that there is inadequate memory resources to save the document, the computer system may generate an alert message that is displayed on the desktop of the computer. However, rather than merely displaying the alert message on the desktop, the alert message may also (or alternatively) be displayed as closed-captioning content to facilitate bringing the alert message to the attention of a user. In some embodiments, the font, color, or size of the closed-captioning content used to display alert messages or other types of closed-captioning content may be altered to distinguish closed-captioning content associated with a higher importance level than other closed-captioning content.

In some embodiments, the selection of closed-captioning content to display on a partitioned display area may be integrated or work in combination with speech synthesis software or hardware. In such embodiments, content that is directed to a speech synthesis engine for output as synthesized speech may also be directed to an off-screen surface or may be provided directly to a screen buffer for display as closed-captioning content. Providing closed-captioning content that would normally have been output via speech synthesis may be particularly helpful for some users with hearing impairments including deaf or partially deaf users who may not be able to hear, or may have difficulty hearing speech output, but may be useful in general for users who may be aided by multimodal output.

In some embodiments, closed-captioning content may be selected for display based, at least in part on selections made using an input device such as a mouse (also called "mouse echo" mode). When mouse echo mode is employed, content associated with a position of the mouse on the display may be intercepted by an accessibility API and written to an off-screen closed-captioning buffer. Accordingly, the mouse echo mode provides the user with a "play-by-play" effect which mirrors the selections the user has made and can be useful by helping the user determine if one of the selections that was made was incorrect.

As described above, writing closed-captioning content to an off-screen buffer enables one or more characteristics of the closed-captioning content to be modified prior to display. Some embodiments of the invention are directed to context-dependent replacement of at least some text in the closed-captioning content with one or more symbols. As discussed in connection with the exemplary partitioned display area shown in FIG. 5, replacement of text with symbols (or icons) may facilitate a user's understanding of the closed-captioning content.

Figure 8:
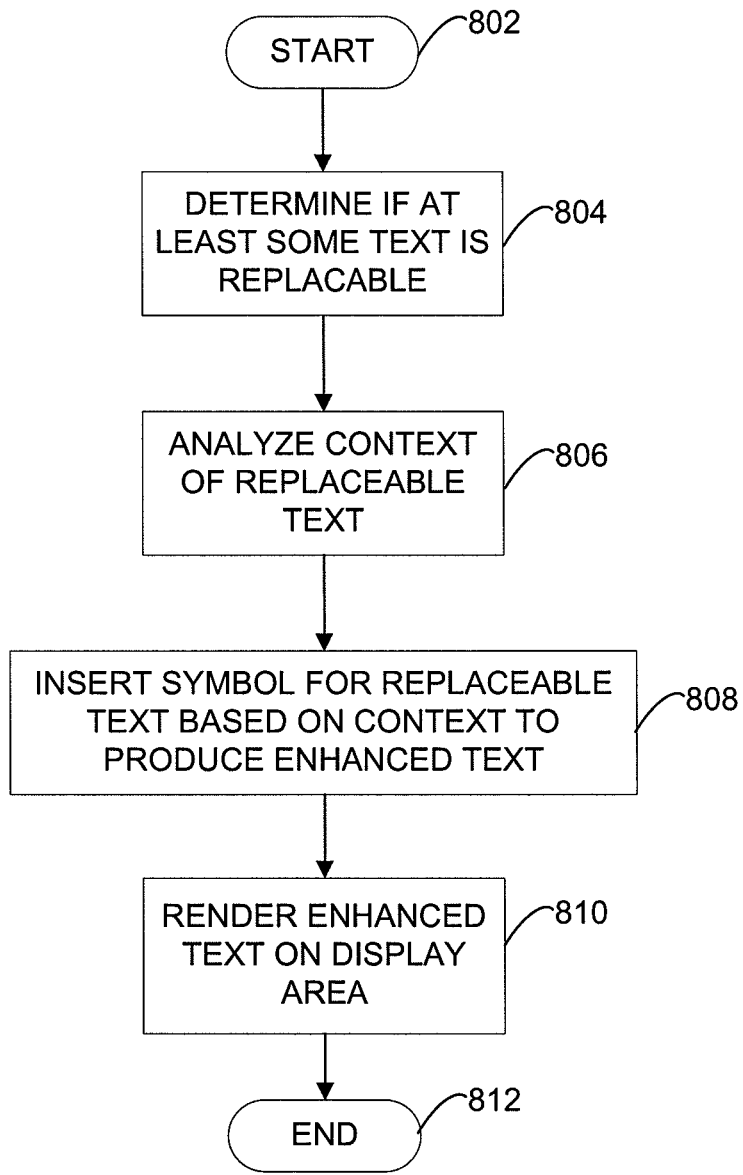
FIG. 8 is a flowchart of a process for replacing at least some content in closed-captioning content with a symbol to produce enhanced content in accordance with some embodiments of the invention.

FIG. 8 illustrates a method for context-dependent text replacement of closed-captioning content in accordance with some embodiments of the invention. In act 802 the process of text replacement begins and in act 804 it is determined if at least some text in the closed-captioning content is a candidate to be replaced by a symbol. Determining whether at least some text is a candidate to be replaced may be performed using any suitable method including, but not limited to, searching for words and/or phrases that are associated with a symbol or icon in a stored lookup table. In the example shown in FIG. 5, the word "mail" was replaced with an envelope icon indicating that the closed-captioning content is related to email. Some implementations may include a lookup table that associates the word mail with the envelope icon and any instances of the word mail that are detected in the closed-captioning content may be determined as candidates for replacement in act 804.

The inventors have recognized that replacement of instances of particular words or phrases in the closed-captioning content based on a lookup table may be improved by analyzing a context associated with the particular word or phrase. Additionally, in some instances, a single word or phrase may be associated with a different symbol or icon when provided in a different context. In act 806 the context of the replaceable text is analyzed prior to replacing the text with a symbol. The context of the replaceable text may be determined in any suitable way and embodiments of the invention are not limited in this respect. In one implementation, meta-information associated with a particular desktop object, tool, or window may be used to determine the context of replaceable text. The meta-information for a desktop object may be obtained by an API configured to determine, for example, which application the desktop object is associated with. For example, the API may be configured to transfer meta-information stored as attributes of a window in which the desktop object resides to an AT driver for processing. Alternatively, the API may capture information associated with the selected desktop object in any other suitable way and embodiments of the invention are not limited in this respect. The captured meta-information may be processed by the AT software and may be written to a closed-captioning buffer prior to being displayed as closed-captioning content on a portion of the display area for the display device.

In the above-described example of replacing the word "mail" with an envelope symbol used to represent email, meta-information associated with a desktop selection object or window may be analyzed to determine whether the text "mail" in the closed-captioning content should be replaced with the "email" symbol or not. In some embodiments, the meta-information may indicate the location of the desktop object, and a determination whether to replace the text with the symbol may be made based on the location of the desktop object. For example, if the desktop object is located within a window for an email program, the meta-information associated with the window may provide a context indicating that the text should be replaced. However, if the desktop object is located within a browser window displaying a web page for a shipping service, the meta-information associated with the window may provide a context indicating that the text should not be replaced.

Another example of context-dependent text replacement, is the replacement of the word "check" with a "checkmark" symbol. The term "check" may be identified in the closed-captioning content in a plurality of different contexts, but replacing the text "check" with a checkmark symbol may only facilitate a user's understanding when the text is present in particular contexts (e.g., when a checkbox is checked). By analyzing the context of replaceable text prior to replacing the text with an associated symbol or icon, the number of erroneous replacements are reduced resulting in displayed closed-captioning content that is easier for the user to understand.

After determining the context of replaceable text in act 806, an associated symbol or icon is inserted into the closed-captioning content based on the context of the replaceable text to produce enhanced text in act 808. The enhanced text includes both text and inserted symbol(s) and may also include one or more other enhancements (e.g., highlighting, underlining, font changes, italics, etc.) applied to the closed-captioning content directed to the off-screen surface. In act 810, the enhanced text is rendered on a portion of the partitioned display area by copying/enhancing the off-screen surface to the composition buffer, which is then presented onto the screen buffer of the display device as described above and the process ends in act 812.

Having thus described several aspects of at least one embodiment of the invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output, speakers or other sound generating devices for audible presentation of output, or Braille displays for tactile presentation of output. Examples of input devices that can be used for a user interface include keyboards, and pointing devices, such as mice, touch pads, digitizing tablets, and Braille input devices. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of displaying a computer desktop and closed captioning content on a display device having a display area, the method comprising:
   displaying the computer desktop on the display device while the display area is unpartitioned;
   receiving a first instruction to display the closed captioning content on the display device;
   in response to receiving the first instruction, partitioning the display area into a first portion for the closed captioning content and a second portion for the computer desktop, the second portion being reduced in size with respect to the unpartitioned display area to make room in the display area for the first portion for the closed captioning content;

capturing closed captioning content from a user application executing on a computer system associated with the display device and/or an operating system of the computer system, wherein the closed captioning content comprises text and is selected from the group consisting of title information for a currently active window displayed on the computer desktop, information about controls in a window displayed on the computer desktop, text typed in a document, help information for a computer desktop or user application element, alert information provided by the user application and/or the operating system, and information redirected for output by a speech synthesizer;

writing at least some of the closed captioning content to a first buffer mapped to the first portion of the display area;

writing at least a portion of the computer desktop to a second buffer mapped to the second portion of the display area and not to the first portion of the display area;

displaying the at least some of the closed captioning content from the first buffer on the first portion of the display area, wherein the at least some of the closed captioning content displayed on the first portion of the display area is selected to facilitate a user interaction with the user application and/or the computer desktop;

analyzing a context of the at least some of the text in the closed captioning content, wherein the context indicates an application type associated with the at least some of the text;

replacing the at least some of the text with at least one user-defined symbol based, at least in part, on the context before displaying the closed captioning content on the first portion of the display area, wherein a same word or phrase in the closed captioning content is replaced with different user-defined symbols in association with different application types;

displaying the at least a portion of the computer desktop from the second buffer on the second portion of the display area; and providing an ability to scroll the at least a portion of the computer desktop within the second portion of the display area, without causing movement of the at least some of the closed captioning content in the first portion of the display area, and without causing movement of the first portion of the display area.

2. The method of claim 1, wherein capturing closed captioning content comprises:
issuing one or more calls to the user application through an API to capture content from the user application; and
including at least some of the captured content in the closed captioning content written to the first buffer mapped to the first portion of the display area.

3. The method of claim 1, wherein a scaling of information displayed on the at least a portion of the computer desktop is not altered in response to partitioning the display area.

4. The method of claim 1, wherein the at least a portion of the computer desktop displayed in the second portion of the display area is a magnified view of the at least a portion of the computer desktop.

5. The method of claim 1, further comprising:
receiving a second instruction to disable closed captioning; and
displaying the at least a portion of the computer desktop on the unpartitioned display area.

6. The method of claim 1, wherein at least one characteristic of the closed captioning content displayed in the first portion of the display area is configurable by a user.

7. The method of claim 6, further comprising:
receiving a second instruction to increase a font size of the closed captioning content; and
in response to receiving the second instruction, automatically increasing a size of the first portion of the display area and reducing a size of the second portion of the display area.

8. The method of claim 1, wherein the context indicates a window type associated with the at least some of the text.

9. The method of claim 8, wherein a same word or phrase in the closed-captioning content is replaced with different symbols in different window types.

10. The method of claim 1, wherein capturing closed captioning content comprises:
intercepting one or more display calls from the user application to display content within the computer desktop; and
including at least some of the intercepted content in the closed captioning content written to the first buffer mapped to the first portion of the display area.

11. At least one non-transitory computer-readable storage medium comprising computer-readable instructions that, when executed by a computer, perform a method of displaying a computer desktop and closed captioning content on a display device having a display area, the method comprising:
displaying the computer desktop on the display device while the display area is unpartitioned;
receiving a first instruction to display closed captioning content on the display device;
in response to receiving the first instruction, partitioning the display area into a first portion for the closed captioning content and a second portion for the computer desktop, the second portion being reduced in size with respect to the unpartitioned display area to make room in the display area for the first portion for the closed captioning content;
capturing closed captioning content from a user application executing on a computer system associated with the display device and/or an operating system of the computer system, wherein the closed captioning content comprises text and is selected from the group consisting of title information for a currently active window displayed on the computer desktop, information about controls in a window displayed on the computer desktop, text typed in a document, help information for a computer desktop or user application element, alert information provided by the user application and/or the operating system, and information redirected for output by a speech synthesizer;
writing at least some of the closed captioning content to a first buffer mapped to the first portion of the display area;
writing at least a portion of the computer desktop to a second buffer mapped to the second portion of the display area and not to the first portion of the display area;
displaying the at least some of the closed captioning content from the first buffer on the first portion of the display area, wherein the at least some of the closed captioning content displayed on the first portion of the display area is selected to facilitate a user interaction with the user application and/or the computer desktop;
analyzing a context of the at least some of the text in the closed captioning content, wherein the context indicates an application type associated with the at least some of the text;
replacing the at least some of the text with at least one user-defined symbol based, at least in part, on the context before displaying the closed captioning content on the first portion of the display area, wherein a same word or phrase in the closed captioning content is replaced with different user-defined symbols in association with different application types;

displaying the at least a portion of the computer desktop from the second buffer on the second portion of the display area; and providing an ability to scroll the at least a portion of the computer desktop within the second portion of the display area, without causing movement of the at least some of the closed captioning content in the first portion of the display area, and without causing movement of the first portion of the display area.

12. The at least one non-transitory computer-readable storage medium of claim 11, wherein capturing closed captioning content comprises:

issuing one or more calls to the user application through an API to capture content from the user application; and including at least some of the captured content in the closed captioning content written to the first buffer mapped to the first portion of the display area.

13. The at least one non-transitory computer-readable storage medium of claim 11, wherein a scaling of information displayed on the at least a portion of the computer desktop is not altered in response to partitioning the display area.

14. The at least one non-transitory computer-readable storage medium of claim 11, wherein the method further comprises:

receiving a second instruction to modify at least one characteristic of the closed captioning content; and in response to receiving the second instruction, automatically increasing a size of the first portion of the display area and reducing a size of the second portion of the display area.

15. The at least one non-transitory computer-readable storage medium of claim 11, wherein capturing closed captioning content comprises:

intercepting one or more display calls from the user application to display content within the computer desktop; and including at least some of the intercepted content in the closed captioning content written to the first buffer mapped to the first portion of the display area.

16. A computer system comprising:

at least one display device having a display area; and at least one processor programmed to:

display the computer desktop on the at least one display device while the display area is unpartitioned;

in response to receiving a first instruction to display closed captioning content, partition the display area into a first portion for the closed captioning content and a second portion for a computer desktop, the second portion being reduced in size with respect to the unpartitioned display area to make room in the display area for the first portion for the closed captioning content;

capture closed captioning content from a user application executing on the computer system and/or an operating system of the computer system, wherein the closed captioning content comprises text and is selected from the group consisting of title information for a currently active window displayed on the computer desktop, information about controls in a window displayed on the computer desktop, text typed in a document, help information for a computer desktop or user application element, alert information provided by the user application and/or the operating system, and information redirected for output by a speech synthesizer;

write at least some of the closed captioning content to a first buffer mapped to the first portion of the display area;

write at least a portion of the computer desktop to a second buffer mapped to the second portion of the display area and not to the first portion of the display area;

display the at least some of the closed captioning content from the first buffer on the first portion of the display area, wherein the at least some of the closed captioning content displayed on the first portion of the display area is selected to facilitate a user interaction with the user application and/or the computer desktop;

analyze a context of the at least some of the text in the closed captioning content, wherein the context indicates an application type associated with the at least some of the text;

replace the at least some of the text with at least one user-defined symbol based, at least in part, on the context before displaying the closed captioning content on the first portion of the display area, wherein a same word or phrase in the closed captioning content is replaced with different user-defined symbols in association with different application types;

display the at least a portion of the computer desktop from the second buffer on the second portion of the display area; and provide an ability to scroll the at least a portion of the computer desktop within the second portion of the display area, without causing movement of the at least some of the closed captioning content in the first portion of the display area, and without causing movement of the first portion of the display area.

17. The computer system of claim 16, wherein capturing closed captioning content comprises:

issuing one or more calls to the user application through an API to capture content from the user application; and including at least some of the captured content in the closed captioning content written to the first buffer mapped to the first portion of the display area.

18. The computer system of claim 16, wherein a scaling of information displayed on the at least a portion of the computer desktop is not altered in response to partitioning the display area.

19. The computer system of claim 16, wherein the at least one processor is further programmed to:

automatically modify a size of the first portion of the display area in response to receiving a second instruction to change at least one characteristic of the closed captioning content.

20. The computer system of claim 16, wherein capturing closed captioning content comprises:

intercepting one or more display calls from the user application to display content within the computer desktop; and including at least some of the intercepted content in the closed captioning content written to the first buffer mapped to the first portion of the display area.

21. Apparatus comprising:

at least one display device having a display area;

at least one processor; and at least one storage medium storing processor-executable instructions that, when executed by the at least one processor, perform a method for displaying a computer desktop and closed captioning content on the display device, the method comprising:

displaying the computer desktop on the at least one display device while the display area is unpartitioned;

in response to receiving a first instruction to display the closed captioning content, partitioning the display area into a first portion for the closed captioning content and a second portion for the computer desktop, the second portion being reduced in size with respect to the unpartitioned display area to make room in the display area for the first portion for the closed captioning content;

capturing closed captioning content from a user application executing on a computer system associated with the at least one display device and/or an operating system of the computer system, wherein the closed captioning content comprises text and is selected from the group consisting of title information for a currently active window displayed on the computer desktop, information about controls in a window displayed on the computer desktop, text typed in a document, help information for a computer desktop or user application element, alert information provided by the user application and/or the operating system, and information redirected for output by a speech synthesizer;

writing at least some of the closed captioning content to a first buffer mapped to the first portion of the display area;

writing at least a portion of the computer desktop to a second buffer mapped to the second portion of the display area and not to the first portion of the display area;

displaying the at least some of the closed captioning content from the first buffer on the first portion of the display area, wherein the at least some of the closed captioning content displayed on the first portion of the display area is selected to facilitate a user interaction with the user application and/or the computer desktop;

analyzing a context of the at least some of the text in the closed captioning content, wherein the context indicates an application type associated with the at least some of the text;

replacing the at least some of the text with at least one user-defined symbol based, at least in part, on the context before displaying the closed captioning content on the first portion of the display area, wherein a same word or phrase in the closed captioning content is replaced with different user-defined symbols in association with different application types;

displaying the at least a portion of the computer desktop from the second buffer on the second portion of the display area; and providing an ability to scroll the at least a portion of the computer desktop within the second portion of the display area, without causing movement of the at least some of the closed captioning content in the first portion of the display area, and without causing movement of the first portion of the display area.

* * * * *